（12）United States Patent
Baer et al.

(10) Patent No.: US 10,929,360 B2
(45) Date of Patent: Feb. 23, 2021

(54) FILTERED PARTITION MAINTENANCE OPERATIONS

(71) Applicant: Oracle International Corporation, Redwood Shores, CA (US)

(72) Inventors: Hermann Baer, San Mateo, CA (US); Ananth Raghavan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 671 days.

(21) Appl. No.: 15/266,863

(22) Filed: Sep. 15, 2016

(65) Prior Publication Data
US 2017/0109377 A1 Apr. 20, 2017

Related U.S. Application Data

(60) Provisional application No. 62/243,344, filed on Oct. 19, 2015.

(51) Int. Cl.
*G06F 16/215* (2019.01)
*G06F 16/9535* (2019.01)
(Continued)

(52) U.S. Cl.
CPC ...... *G06F 16/215* (2019.01); *G06F 16/24554* (2019.01); *G06F 16/335* (2019.01); *G06F 16/9535* (2019.01)

(58) Field of Classification Search
CPC ............... G06F 16/335; G06F 16/215; G06F 16/24554; G06F 16/9535
(Continued)

(56) References Cited

U.S. PATENT DOCUMENTS 5,412,804 A * 5/1995 Krishna ............ G06F 16/24544
707/999.002
5,551,027 A * 8/1996 Choy ..................... G06F 9/355
712/E9.042
(Continued)

OTHER PUBLICATIONS

"What are the difference between DDL, DML and DCL commands?" from Date: Mar. 7, 2016, http://www.orafaq.com/wiki/SQL_FAQ#What_are_the_difference_between_DDL.2C_DML_and_DCL_commands.3F.

*Primary Examiner* — Phong H Nguyen
(74) *Attorney, Agent, or Firm* — Vista IP Law Group, LLP

(57) ABSTRACT

A database engine performs row filtering operations concurrently with performing database object partition maintenance operations. The filtering operations do not incur the high processing costs of database delete or purge operations that would incur per row costs for logging, locking, etc. The partitioning and filtering operations are specified in multiple clauses of a single database language statement. The clauses of the statement are executed concurrently. A method implementation receives a database language statement that comprises a partitioning operation specification as well as a filtering operation specification that includes a logical predicate for determining whether or not to filter-out predicate-matching entries when forming the resulting partitioned target database object. While processing the partitioning operations, the method discards entries taken from the source database object whenever the entry corresponds to the logical predicate. The target database object contains some entries that derive from the source, but does not contain the discarded entries.

20 Claims, 10 Drawing Sheets

(51) Int. Cl.
*G06F 16/2455* (2019.01)
*G06F 16/335* (2019.01)

(58) Field of Classification Search
USPC .................................. 707/692, 754
See application file for complete search history.

(56) References Cited

U.S. PATENT DOCUMENTS

| | | | |
|---|---|---|---|
| 6,349,310 B1* | 2/2002 | Klein | G06F 16/2282 707/703 |
| 7,047,250 B1* | 5/2006 | Agarwal | G06F 16/284 707/E17.005 |
| 7,111,020 B1* | 9/2006 | Gupta | G06F 16/24539 707/999.002 |
| 7,113,957 B1* | 9/2006 | Cohen | G06F 16/284 707/714 |
| 7,213,011 B1* | 5/2007 | Das | G06F 16/24537 707/999.005 |
| 7,299,239 B1 | 9/2007 | Basu et al. | |
| 7,814,104 B2 | 10/2010 | Raghavan et al. | |
| 7,870,174 B2 | 1/2011 | Eadon et al. | |
| 7,930,297 B2 | 4/2011 | Yu et al. | |
| 8,145,642 B2* | 3/2012 | Cruanes | G06F 16/2456 707/745 |
| 8,620,888 B2 | 12/2013 | Basu et al. | |
| 9,489,413 B2* | 11/2016 | Raghavan | G06F 9/466 |
| 9,507,825 B2 | 11/2016 | Baer et al. | |
| 10,360,210 B2* | 7/2019 | Seufert | G06F 16/951 |
| 2003/0158897 A1* | 8/2003 | Ben-Natan | H04L 29/06 709/204 |
| 2004/0249845 A1* | 12/2004 | Das | G06F 16/24537 707/999.101 |
| 2005/0222980 A1* | 10/2005 | Lee | G06F 16/278 707/E17.032 |
| 2006/0117036 A1* | 6/2006 | Cruanes | G06F 16/2456 707/999.1 |
| 2006/0253429 A1* | 11/2006 | Raghavan | G06F 16/24557 707/999.003 |
| 2008/0177957 A1* | 7/2008 | Lee | G06F 16/24544 711/161 |
| 2009/0063527 A1* | 3/2009 | Corvinelli | G06F 16/24544 707/999.101 |
| 2009/0100089 A1* | 4/2009 | Eadon | G06F 16/24554 707/E17.054 |
| 2009/0177622 A1* | 7/2009 | Hu | G06F 16/2272 707/999.002 |
| 2011/0119288 A1* | 5/2011 | Sinha | G06F 16/288 707/769 |
| 2014/0067793 A1* | 3/2014 | Shironoshita | G06F 16/24526 707/718 |
| 2015/0278327 A1* | 10/2015 | Raghavan | G06F 9/466 707/615 |
| 2015/0324382 A1* | 11/2015 | Seufert | G06F 16/2453 707/696 |

* cited by examiner

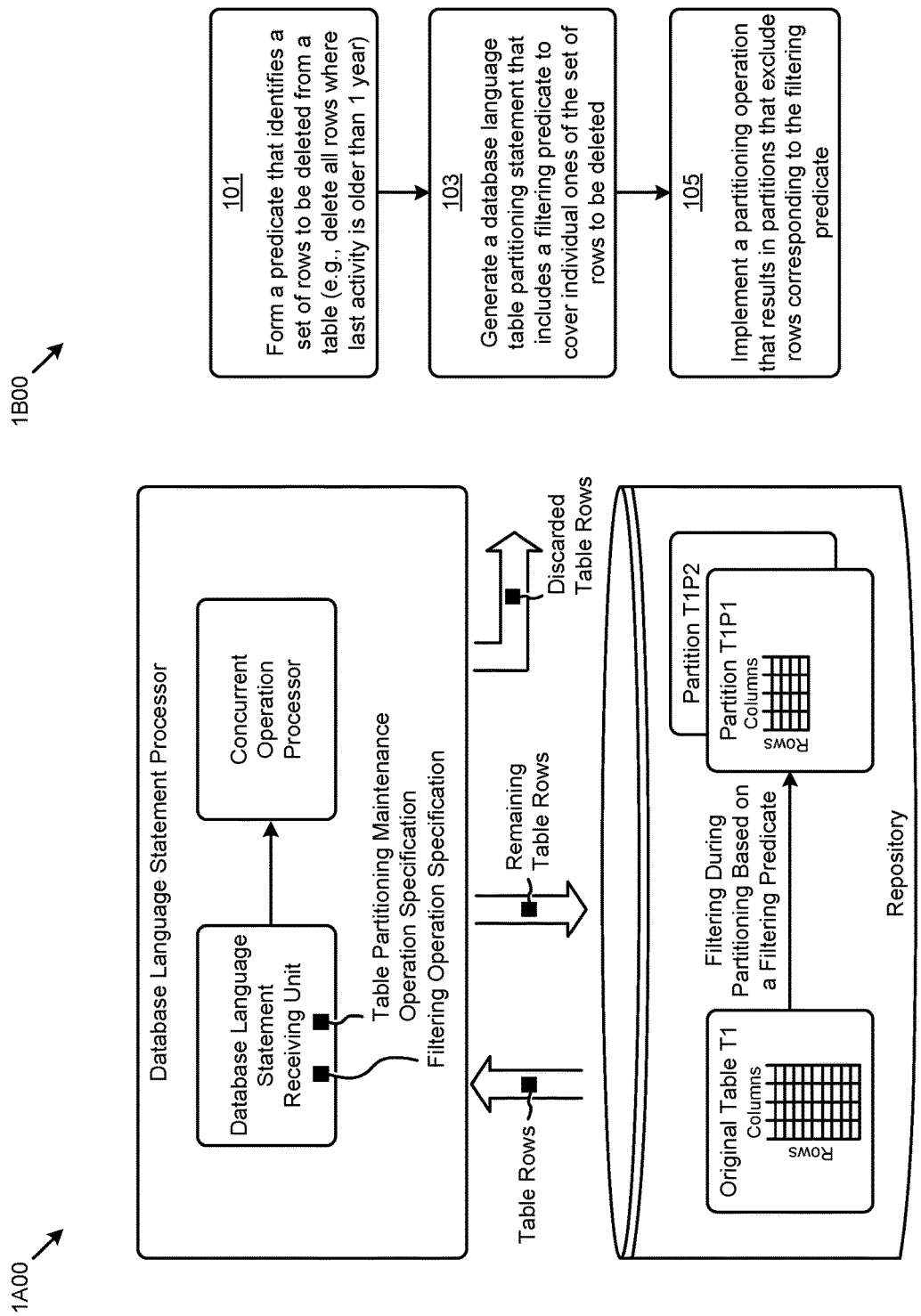

FILTERED PARTITION MAINTENANCE OPERATIONS

RELATED APPLICATIONS

The present application claims the benefit of priority to U.S. Provisional Patent Application Ser. No. 62/243,344 titled, "FILTERED PARTITION MAINTENANCE OPERATIONS", filed Oct. 19, 2015, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

A database administrator might want to delete or purge rows from database tables on a periodic basis (e.g., during periodic database maintenance). The periodic basis might derive from an aging basis (e.g., pertaining to a data retention period), or might derive from a status basis (e.g., pertaining to accounts that are "status=closed"). The same database administrator might want to perform other maintenance operations on the objects (e.g., tables) of the database. One such maintenance operation involves table partitioning operations. A table might be subjected to partitioning operations (i.e., to divide a large table into a set of smaller partitions) when the table grows and eventually becomes "too big". One legacy approach to ongoing table maintenance is to perform row deletions followed by table partitioning operations. Another legacy approach is to perform table partitioning operations followed by row deletions over the partitions that resulted from the partitioning. Both legacy approaches are unnecessarily expensive.

Many database systems support language constructs to define and manipulate objects (e.g., tables) in a database. For reasons of usability, resiliency, disaster recovery, etc., commands that involve data manipulation of objects often spawn other operations such as locking (e.g., locking out other concurrent accesses), processing commit behaviors over transactions, unlocking operations after commits, timestamping and logging undo/redo entries, etc. The total cost (e.g., computing resource and time costs) of performing data manipulation operations along with the aforementioned spawned operations is thus much greater than the cost of merely performing the data operation itself.

The intent of a delete record operation is to purge an item (or set of items) from the database. Even though the deleted record will never again be accessed, the aforementioned total costs are incurred. In scenarios involving mass deletions (e.g., delete all "closed tickets" from the customer support database, delete all of "last year's" unfinished items from the TODO database, etc.), the costs can become quite significant. What is needed are techniques that perform deletions (e.g., data removal operations) that do not incur the burdensome costs as heretofore described.

What is needed is a technique or techniques to improve over legacy and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The drawings described below are for illustration purposes only. The drawings are not intended to limit the scope of the present disclosure.

FIG. 1A is a system for performing partition maintenance operations using a query language predicate as part of a data definition operation, according to an embodiment.

FIG. 1B is a flowchart for performing partition maintenance operations using a query language predicate as part of a data definition operation, according to an embodiment.

DETAILED DESCRIPTION

Figure 1C:
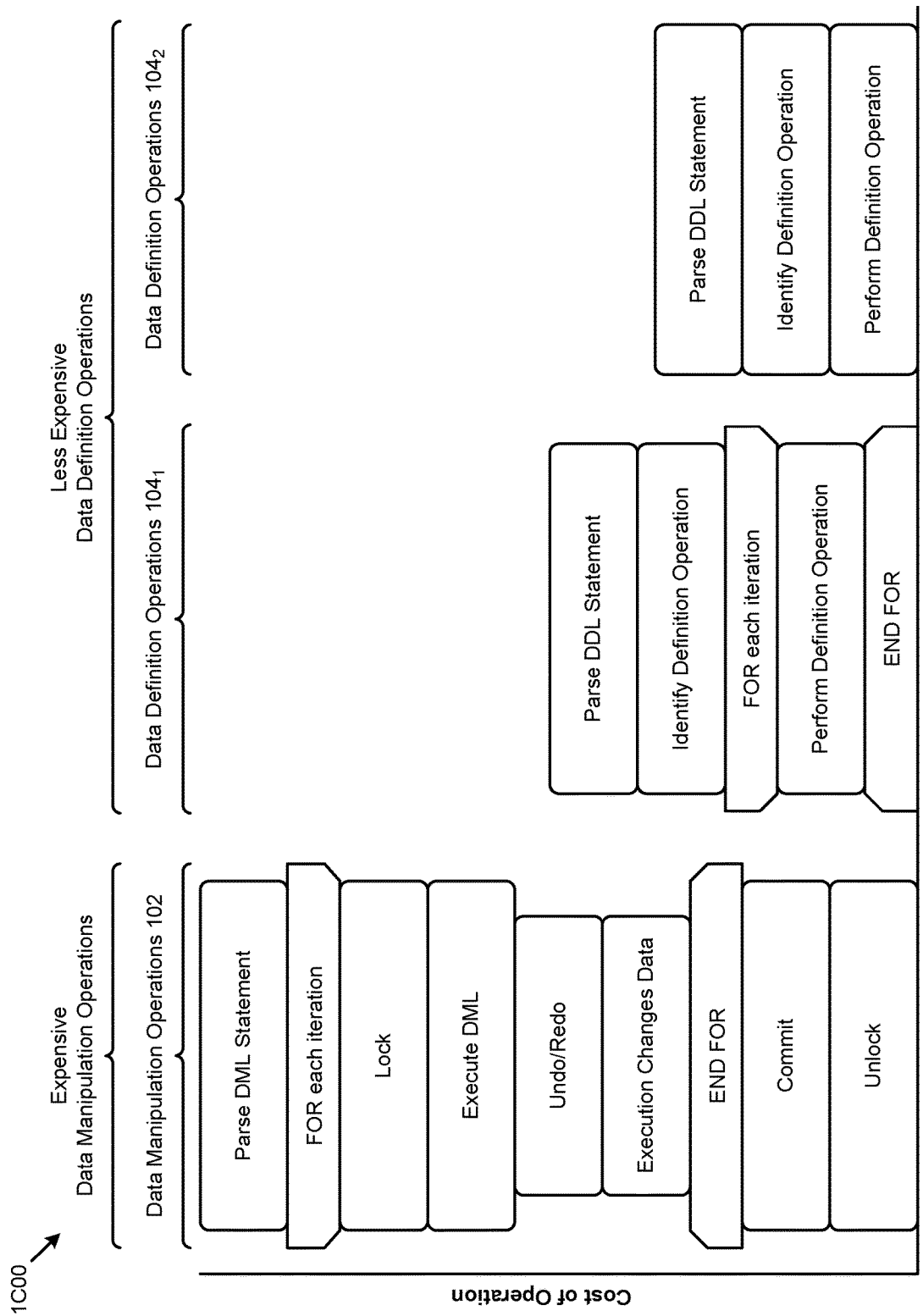
FIG. 1C is a comparison chart that compares the incurred costs of processing a data manipulation operation as compared to performing partition maintenance operations using a query language predicate as part of a data definition operation.

Some embodiments of the present disclosure address the problem of data manipulation commands in a resilient database management system that incur very high and unnecessary processing overhead when deleting or purging items. Some embodiments are directed to approaches for filtering rows to include rows (or exclude rows) based on a logical predicate that is processed during the course of performing partition maintenance operations.

OVERVIEW

Over time, database objects (e.g., tables) in a database tend to grow (e.g., as entries are added, or as rows are inserted). When a database object gets too big, a database administrator might want to delete or purge unneeded contents from the database object. Even though the deleted or purged records might never again be accessed, processing cost of a database DELETE operation is incurred for each item that is deleted. In some scenarios involving mass deletions (e.g., DELETE all "closed tickets" from the customer support database, the costs can be significant. Similarly, when a database object gets too big, a database administrator might want to perform database object partitioning. Using the herein-disclosed filtering techniques, the delete or purge instructions can be combined with database partitioning instructions and thereby generate new partitions that do not contain the to-be-deleted items. During partitioning, the to-be-deleted items are filtered out (e.g., discarded). The resulting partitions would not contain the to-be-deleted items, thus resulting in the same set of items as would be present had the items been deleted or purged using a DELETE operation.

Database System Data Organization

In a database management system (DBMS), data is stored in one or more data containers, each container contains records, and the data within each record is organized into one or more fields. In relational DBMSs, the data containers are referred to as tables, the records are referred to as rows, and the fields are referred to as columns. In a relational DBMS, many operations can be performed over rows and/or columns in tables. For example, a table can be queried so as to determine a set of rows that match a particular query predicate (e.g., return only the "closed tickets" from the customer support database). Query predicates may be specified within an expression or statement in a query language such as SQL.

Some enterprises may run very large databases. For example, some databases may store terabytes (TB) or more of data, and in some cases may even store petabytes of data. Database sizes are expected to continue to grow even larger. Supporting and maintaining these ever-expanding databases often involves deleting out-of-date or otherwise unwanted data. Due to the cost of performing such data manipulation operations (e.g., logging undo/redo events), even routine periodic maintenance can become onerously expensive. One tool used to simplify this maintenance is partitioning. Partitioning facilitates managing large volumes of data by providing a "full table" logical view to applications while actually storing the contents of the full table in multiple physical partitions.

Partitions share the same logical attributes as the table from which they were created. These logical attributes may include column definitions, number of columns, constraint definitions, and so on. Partitioning schemes may be described using data definition language statements, and such statements can define, for example, a partition range or value partitioning scheme, a hash partitioning scheme, a list partitioning scheme, and so on. Range partitioning schemes may map rows into multiple physical partitions of the same logical table based on ranges or values of data found in the columns. Date ranges, age ranges, grade point average ranges, status values (e.g., OPEN, CLOSED, etc.) are commonly used in range or value partitioning.

Further details regarding various techniques for partitioning a database object are described in U.S. Pat. No. 7,299,239, titled, "METHODS FOR PARTITIONING AN OBJECT", which is hereby incorporated by reference in its entirety.

Partitioning is not restricted to data tables. Indexes may also be partitioned. A local index may be constructed so that it reflects the partitioning scheme of an underlying table. Judicious use of partitioning allows large database tables and indexes to be decomposed into smaller, more manageable portions. A database management system (DBMS) may allow structured query language (SQL) queries and data manipulation language (DML) statements to access these partitions. A DBMS may also allow data definition language (DDL) statements to define the specific characteristics of partitions formed from a table or index.

As disclosed herein, the semantics of partition maintenance operations (e.g., partitioning a table into multiple partitions) can be combined with the semantics of data filtering operations (e.g., to filter out rows during the performance of the maintenance operations). When the semantics of both types of operations (e.g., DDL and DML statements, respectively) are combined during the maintenance operations, the total cost of performing the maintenance operations is much lower than if the partitioning operations and the filtering operations were performed separately.

As such, a DDL statement to generate two partitions can be performed while concurrently processing the semantics of one or more DML statements to filter out all records where, for example, "status=CLOSED". This can be done using a fraction of the computing resources needed to perform data manipulation language statements to (1) move all rows from the source table to two new tables and then (2) deleting all records where, for example, "status=CLOSED".

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

DEFINITIONS

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXAMPLE EMBODIMENTS

FIG. 1A is a system 1A00 for performing partition maintenance operations using a query language predicate as part of a data definition operation. As shown, a database language statement processor receives a partition maintenance operation statement that includes a first portion comprising a table partitioning maintenance operation specification and a second portion comprising a filtering operation specification. The shown system operates to retrieve rows from a table and process the rows in accordance with the partitioning and filtering specifications. Table rows that correspond to the filtering operation specification are merely discarded during the table partitioning maintenance operation. The remaining table rows are stored in a specified partition. The table partitioning maintenance operation specification might specify any number of partitions (e.g., Partition T1P1, and Partition T1P2, as shown).

Using the capability to perform filtering during partitioning based on a filtering predicate, a database administrator can define filtering predicates to cover to-be-discarded table rows that are discarded during partition maintenance operations. One possible flow to aid in database table administration is provided in FIG. 1B.

FIG. 1B is a flowchart 1B00 for performing partition maintenance operations using a query language predicate as part of a data definition operation. A database administrator can form predicate (at step 101) that identifies a set of rows to be eliminated from a table. In this example, the database administrator wants to eliminate "old" rows (e.g., where a "last activity" field contains a value that is older than 1 year). In accordance with the embodiments disclosed herein, the database administrator will generate (at step 103) a database language table partitioning statement that includes a filtering predicate to apply to individual ones of the set of rows to be eliminated. The partitioning operation is performed (at step 105). During the performance of the partitioning operation, the rows of the subject table that match the filtering predicate are discarded. The newly populated partition(s) do not contain the rows from the subject table that have been discarded.

Rather than using a DELETE statement (see FIG. 1C), the semantics for which carries high processing costs (e.g., locking, redo/undo processing, etc.), the to-be-eliminated rows are merely discarded during the partitioning operation. The cost of performing data manipulation operations, such as to DELETE rows, is often much higher than the cost of performing data definition operations, such as to ALTER a table. A sample of relative cost comparisons is presented in the following FIG. 1C.

FIG. 1C is a comparison chart 1C00 that compares the incurred costs of processing a data manipulation operation as compared to performing partition maintenance operations using a query language predicate as part of a data definition operation.

As depicted, the cost of performing data manipulation operations 102 is much higher than the cost of performing data definition operations $104_1$ or data definition operations $104_2$. In the particular comparison shown, a data manipulation operation can begin by parsing a DML statement to identify one or more data manipulation operations. Carrying out such data manipulation operations might involve a plurality of sub-operations (e.g., operations on a plurality of rows), each of which incurs the cost to lock a row, insert or change the data of the row, as well as the cost to format and make an entry in an undo/redo stream. After the plurality of sub-operations has completed, the results of such sub-operations need to be committed, incurring still additional costs. More costs might be incurred to release the locks if any were taken out and then need to be released after processing the iterations.

For comparison, when processing a data definition operation, the processing and costs thereto might amount to only parsing the DDL statement, identifying the DDL operation, and performing the DDL operation, possibly using an iterator (e.g., data definition operations $104_1$). In some cases, processing a data definition operation might not involve iterations or an iterator at all (e.g., data definition operations $104_2$).

Strictly as examples, data manipulation language (DML) statements deal with data within database objects (e.g., tables). Some example data manipulation statements and related DML operations are:

SELECT: retrieve data from a database based on a predicate;
INSERT: insert data into a table;
UPDATE: update existing data within a table;
DELETE: delete records from a table; and
LOCK TABLE: control concurrency.

In contrast, strictly as examples, data definition language (DDL) statements deal with the structure of database objects themselves. Some example data definition language statements are:

CREATE: create an object in the database;
ALTER: alters the structure of an object in the database;
DROP: delete objects from the database;
TRUNCATE: remove all records from a table, including all spaces allocated for the records are removed; and
RENAME: rename an object.

In accordance with some embodiments, certain specific semantics of data manipulation language statements can be combined with the semantics of data definition language statements. For example, during the execution of a data definition language statement to ALTER a table (e.g., to partition a table into two or more partitions), some portions of data manipulation operations for DELETE (e.g., discard) can be performed. In exemplary situations, a data definition language statement to ALTER a table would consider each row in the table. When a particular row in the table is being considered for partitioning purposes (e.g., for a splitting a partition or for moving a partition) it is less costly to consider that row for filtering and elimination than it would be to perform DELETE operations on the same rows either before or after the partitioning.

Filtering can be specified so as to explicitly exclude or include rows that match the filtering predicate. The following FIG. 2A and FIG. 2B depict row exclusion and row inclusion, respectively.

Figure 2A:
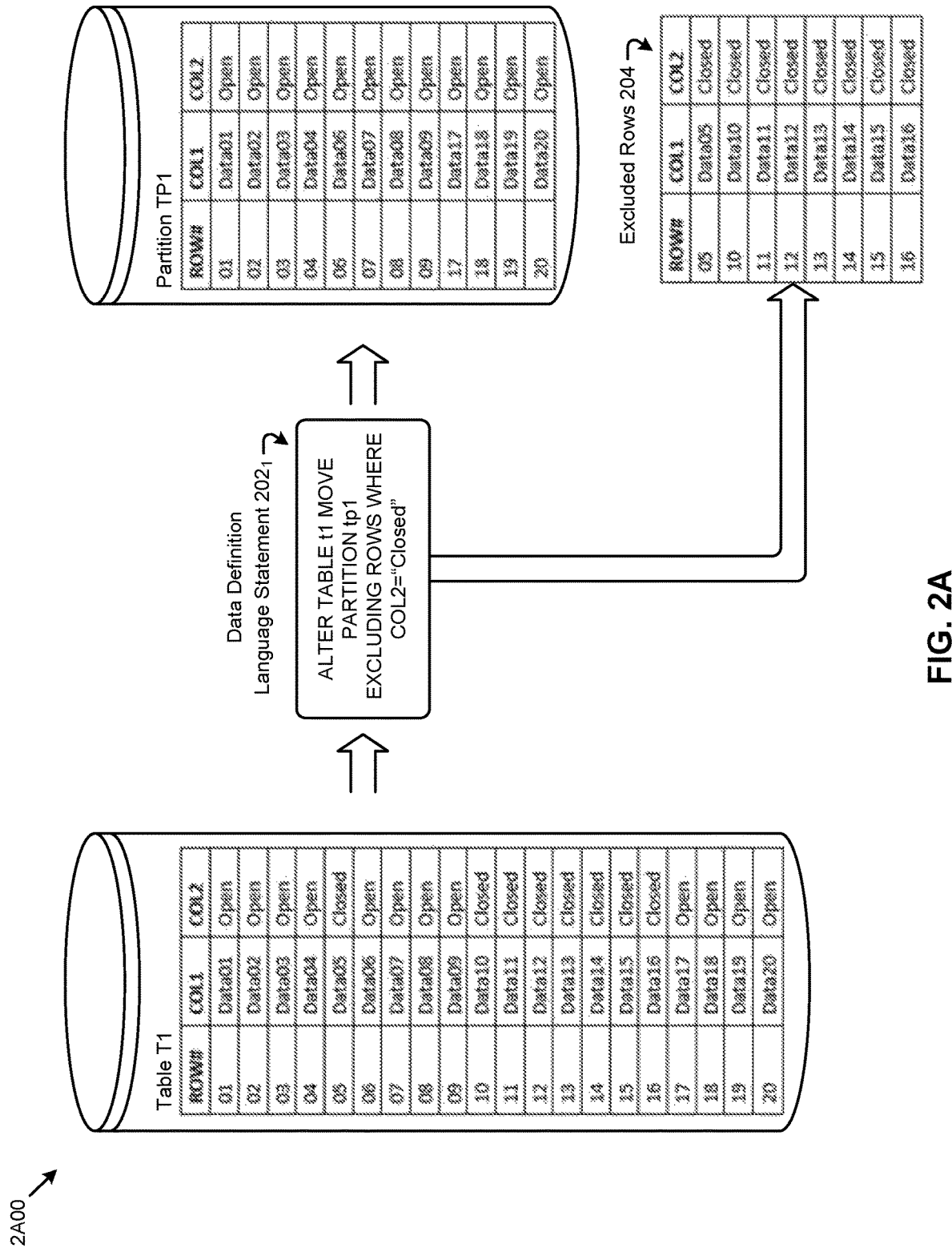
FIG. 2A depicts a row exclusion operation to purge excluded rows when performing partition maintenance operations using a query language predicate as part of a data definition operation, according to an embodiment.

FIG. 2A depicts a row exclusion operation 2A00 on "Table T1" to purge excluded rows when performing partition maintenance operations using a query language predicate as part of a data definition operation. As an option, one or more variations of row exclusion operation 2A00 or any aspect thereof may be implemented in the context of the architecture and functionality of the embodiments described herein. The row exclusion operation 2A00 or any aspect thereof may be implemented in any environment.

As shown, a table T1 with named partition TP1 is the subject of the shown data definition language statement $202_1$. The result of execution of the shown data definition language statement $202_1$ is that partition TP1 is moved while rows in the subject table that satisfy the predicate "WHERE COL2="Closed" are excluded (excluded rows 204) from the MOVE results.

Figure 2B:
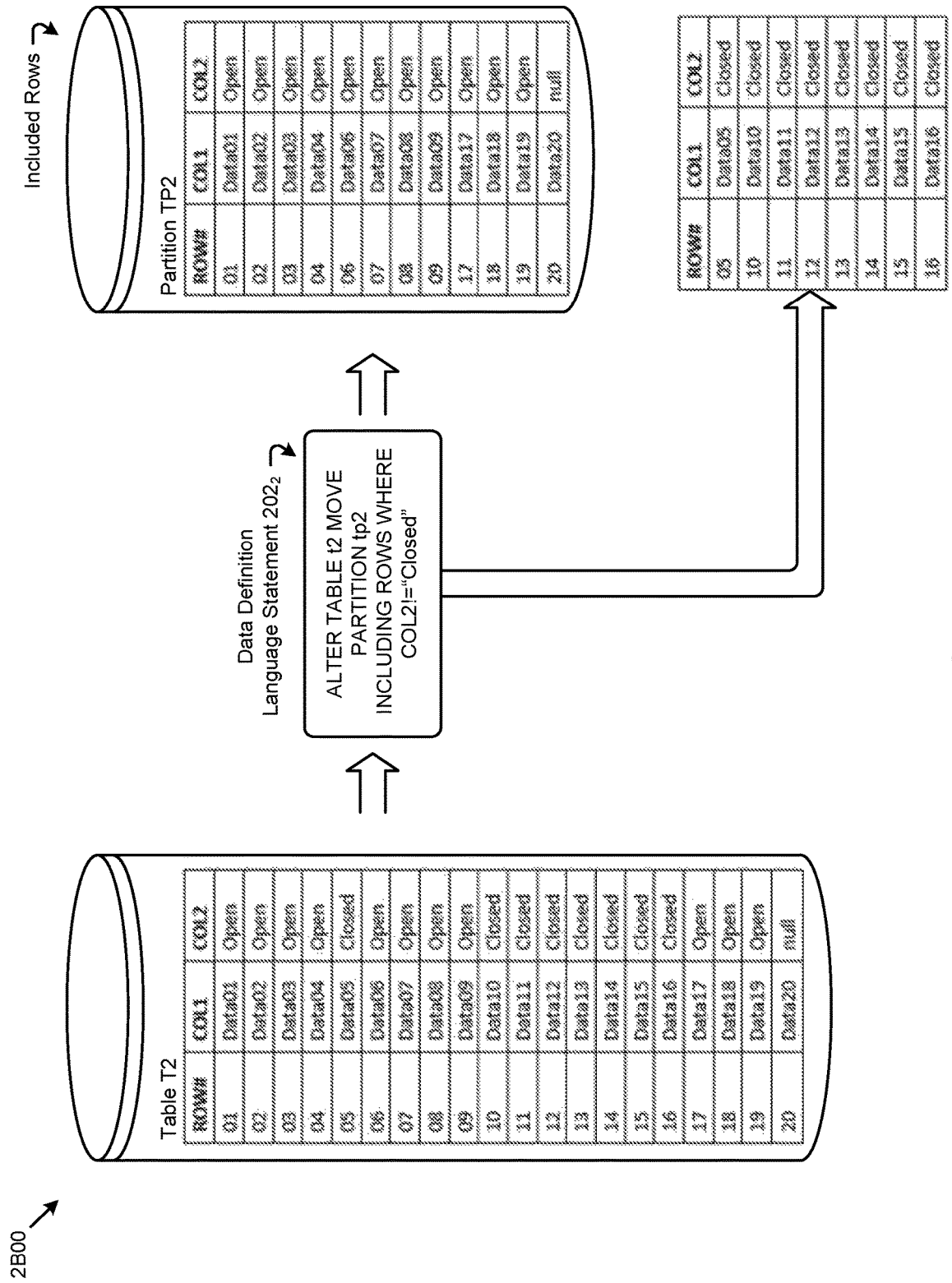
FIG. 2B depicts a row inclusion operation to purge non-included rows when performing partition maintenance operations using a query language predicate as part of a data definition operation, according to an embodiment.
Figure 2C:
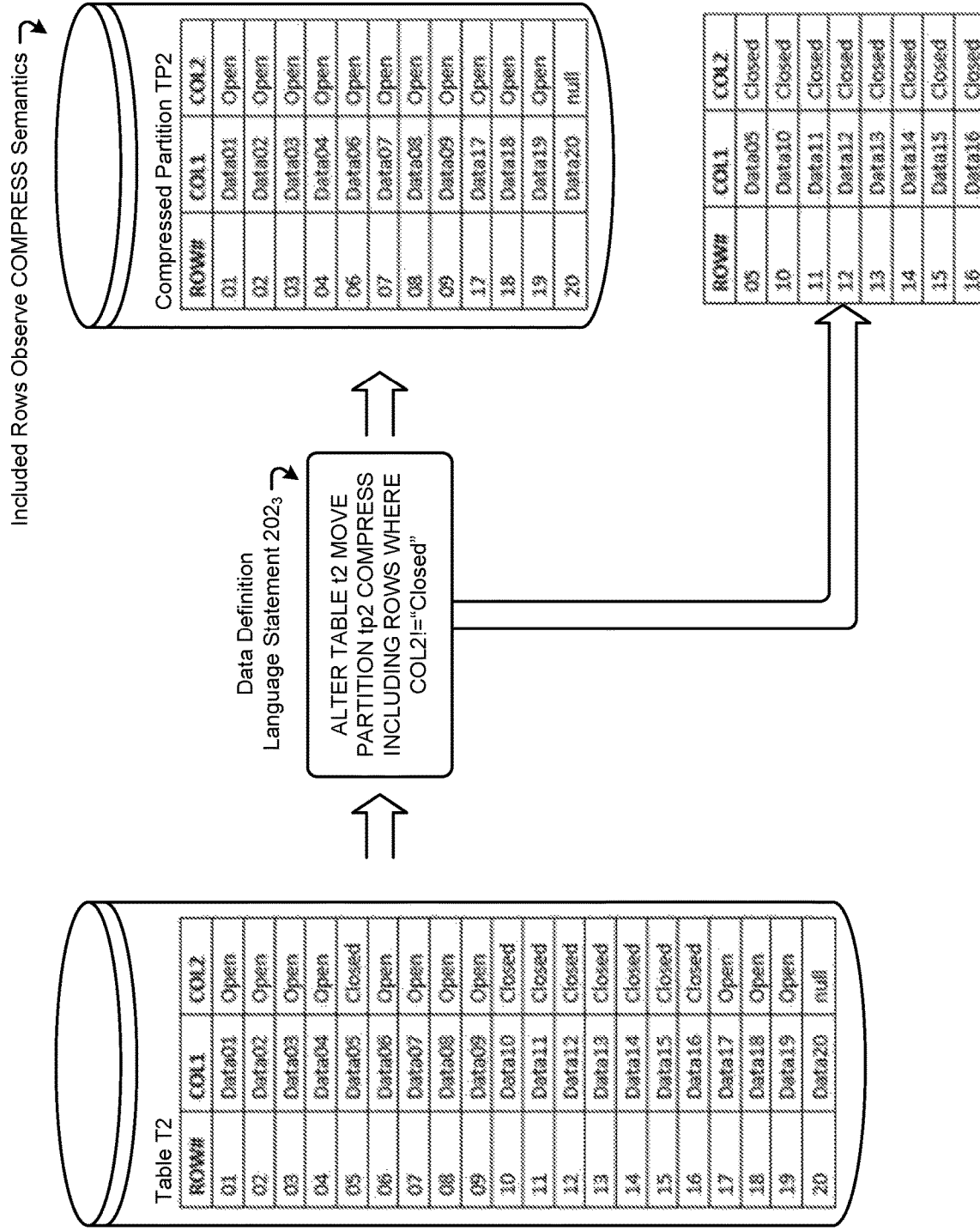
FIG. 2C depicts a row inclusion operation to purge non-included rows when performing a partition COMPRESS operation using a query language predicate as part of a data definition operation, according to an embodiment.

Filtered partition statements such as depicted in FIG. 2A, FIG. 2B, and FIG. 2C provide high performance functionality to combine data manipulation operations with partition maintenance operations. Partition maintenance—changing the logical shape as well as physical attributes of a partition—and data manipulation to include or exclude individual rows based on query language filter predicates can be performed using a single command.

Strictly as one example, a single command to move order data from "Q1/2012" to a different storage area and to only preserve orders (e.g., rows) that are not yet fulfilled, can be written as given in Table 1:

TABLE 1

| Ref | Information |
|---|---|
| 1 | ALTER TABLE sales MOVE PARTITION sales_q1_2012 TABLESPACE cheap_storage FOR QUERY HIGH |
| 2 | INCLUDING ROWS WHERE order_fullfilled = 'N' ONLINE; |

By specifying keywords (e.g., an ALTER keyword, a MOVE keyword, a SPLIT keyword, or a MERGE keyword) and a filter expression (e.g., "EXCLUDING ROWS WHERE <condition>", or a Boolean expression) as part of the partition maintenance operation (e.g., the merge, or the split, or the move), the cost to perform the data definition operation (e.g., MOVE) in parallel with the data manipulation operation (e.g., EXCLUDING ROWS) can be significantly reduced as compared with performing those operations sequentially.

In some embodiments, the filter condition "EXCLUDING ROWS WHERE <condition>" (e.g., referring to an exclusion operation) can be codified with the opposite filtering sense, as in "INCLUDING ROWS WHERE <condition>" (e.g., referring to an inclusion operation).

FIG. 2B depicts a row inclusion operation 2B00 to purge non-included rows when performing partition maintenance operations using a query language predicate as part of a data definition operation. As an option, one or more variations of row inclusion operation 2B00 or any aspect thereof may be implemented in the context of the architecture and functionality of the embodiments described herein. The row inclusion operation 2B00 or any aspect thereof may be implemented in any environment.

The shown row inclusion operation 2B00 refers to table T2 partition TP2 as the subject of the shown data definition language statement $202_2$. The result of execution of the shown data definition language statement $202_2$ is that a partition TP2 is generated. Rows in the subject partition TP2 of table T2 that satisfy the predicate, "WHERE COL2!="Closed" are included in the generated partition TP2. The other rows are excluded since they do not satisfy the predicate.

FIG. 2C depicts a row inclusion operation to purge non-included rows when performing a partition operation using a query language COMPRESS keyword and a predicate as part of a data definition operation. The shown row inclusion operation refers to table T2 partition TP2 as the subject of the shown data definition language statement $202_3$. The result of execution of the shown data definition language statement $202_3$ is that a compressed partition TP2 is generated during the performance of the data definition statement. Use of the COMPRESS keyword on a table object enables compression for all applicable operations that are performed on the table thereafter.

Rows in the subject partition TP2 of table T2 that satisfy the predicate, "WHERE COL2!="Closed" are included in the generated compressed partition TP2. Upon generation of compressed partition TP2, and on an ongoing basis, the compressed partition TP2 observes COMPRESS semantics (e.g., new rows are compressed upon entry, etc.).

Figure 3:
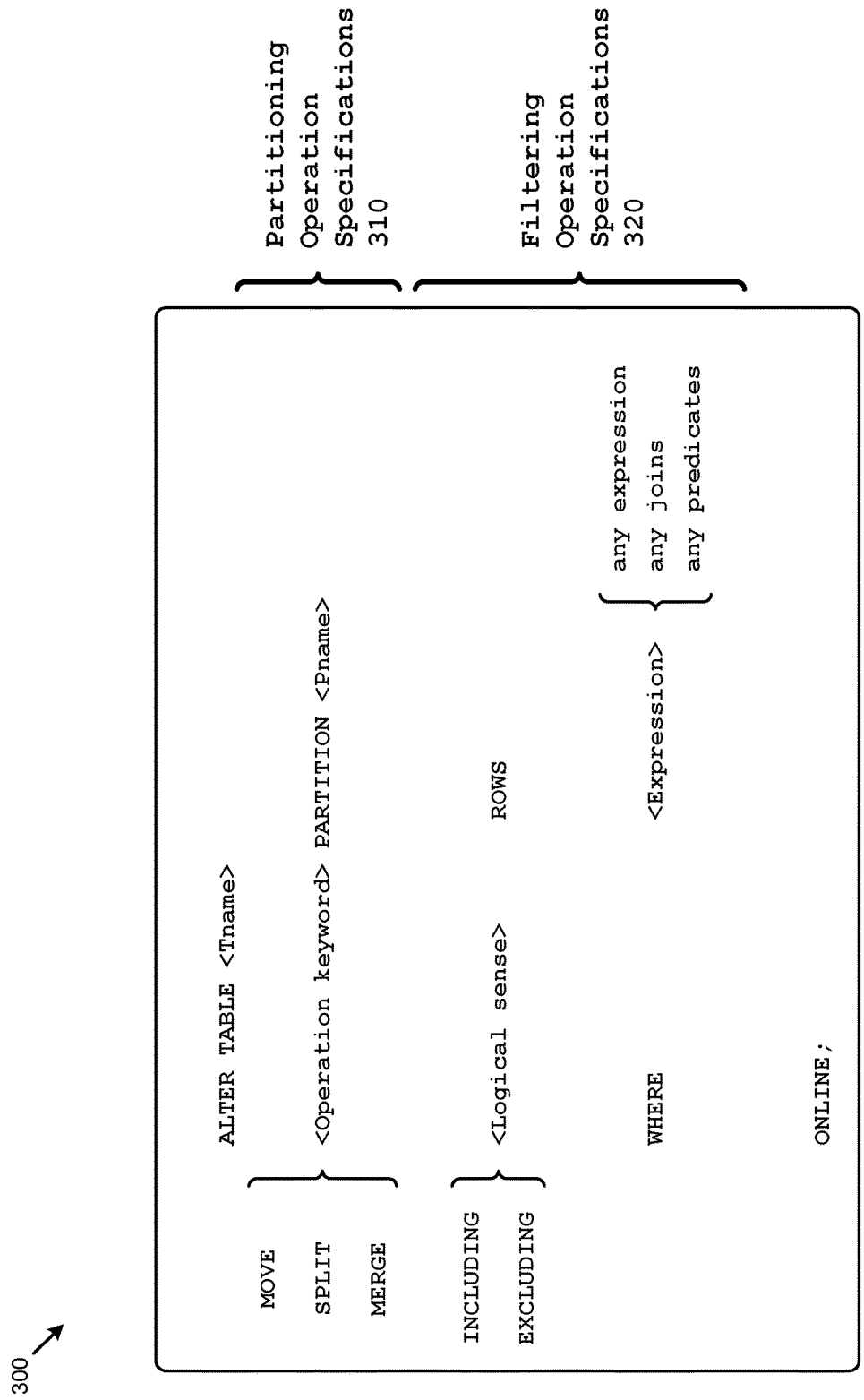
FIG. 3 presents a database language statement syntax used to specify partition maintenance operations using keywords and a query language predicate, according to an embodiment.

FIG. 3 presents a database language statement syntax 300 used to specify partition maintenance operations using keywords and a query language predicate. As an option, one or more variations of database language statement syntax 300 or any aspect thereof may be implemented in the context of the architecture and functionality of the embodiments described herein. The database language statement syntax 300 or any aspect thereof may be implemented in any environment.

The embodiment shown in FIG. 3 is merely one example syntax. As shown, the statement includes the keywords ALTER TABLE followed by a table name. A particular operation keyword (e.g., MOVE, SPLIT, MERGE, etc.) is followed by keyword PARTITION(S), followed by a name of one or multiple partitions, depending on the partition maintenance operation. The logical sense to apply to the rows that satisfy the predicate is specified using a keyword (e.g., INCLUDING or EXCLUDING). The predicate can be specified using a WHERE keyword in combination with an expression (e.g., any expression, any joins, any predicates).

As shown, portions of the database language statement comprise partitioning operation specifications 310 and other portions of the database language statement comprise filtering operation specifications 320. The specified filtering operations (e.g., filtering based on a predicate) are performed concurrently with the specified partition maintenance operations.

In some cases a database language statement might further comprise specifications of additional operations and/or other language constructs to convey processing semantics. For example, and as shown, the optional keyword ONLINE specifies that the partitioning operation is to be performed without lockouts (also see the discussion as pertaining to FIG. 4). In exemplary cases, filtered partition maintenance operations can be performed as a single atomic transaction.

Figure 4:
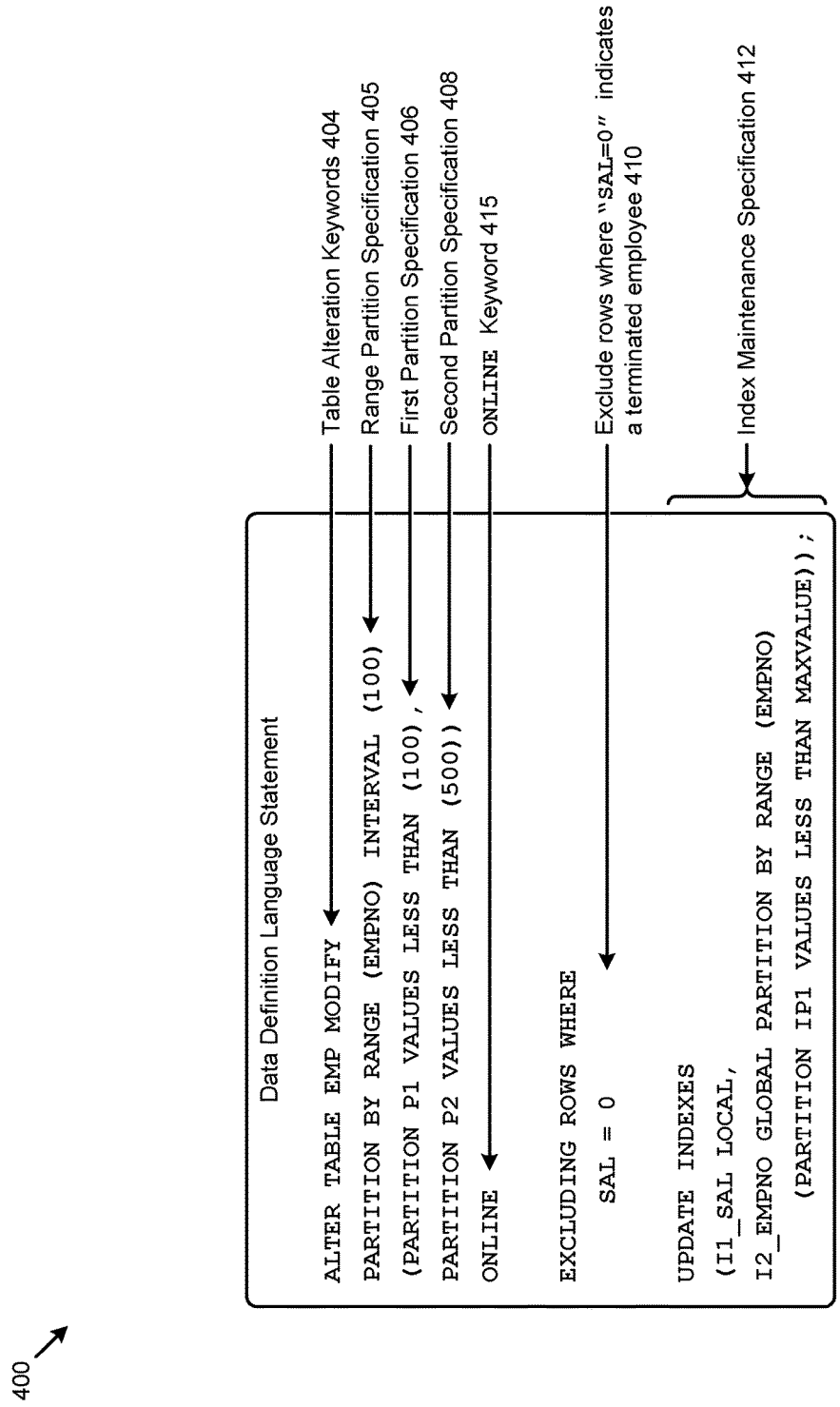
FIG. 4 presents an example database language statement used to change a nonpartitioned table into a partitioned table by specifying the new partitions by value, according to an embodiment.

FIG. 4 presents an example database language statement 400 used to change a nonpartitioned table into a partitioned table by specifying the new partitions by value. As an option, one or more variations of example database language statement 400 or any aspect thereof may be implemented in the context of the architecture and functionality of the embodiments described herein. The example database language statement 400 or any aspect thereof may be implemented in any environment.

The example database language statement shown in FIG. 4 conforms to the database language statement of FIG. 3. As disclosed herein, the syntax and semantics supports non-blocking performance of partition maintenance statements so as to modify a non-partitioned table into multiple partitions. This example includes table alteration keywords 404 (e.g., "ALTER TABLE" and "MODIFY") to perform operations on table "EMP". Table "EMP" is modified to become a range partitioned table based on the values of column "EMPNO" with all partitions that are not explicitly defined as being interval partitions with a unified range of 100 as defined in the range partition specification 405. An explicit first partition specification 406 (e.g., pertaining to partition P1, as shown), and as well as a second explicit partition specification 408 (e.g., pertaining to partition P2) are provided in addition to the generic range partition specification 405.

Concurrent with performance of the shown DDL operations to modify the non-partitioned table into multiple partitions, rows can be filtered (e.g., by using the EXCLUDING keyword). In this example, the predicate is given as "WHERE SAL=0". The semantics of annotation 410 means to exclude rows pertaining to terminated employees.

In some cases, indexes can be regenerated so as to reflect the location of the indexed item in the new partitions. The index maintenance specification 412 is merely one example. Specifically, the index I1_SAL LOCAL is converted to a local partitioned index. The unique index I2_EMPNO is converted to a global partitioned unique index. In some cases, any unspecified non-unique indexes can be automatically converted to a local partitioned index by default. In some cases, unspecified unique indexes that are non-prefixed can be automatically converted to global indexes. Further, in some cases, metadata pertaining to the table being modified (e.g., triggers, constraints, ancillary structures, etc.) are retained and/or updated on the partitioned table as well.

If the ONLINE keyword 415 is specified, this ALTER TABLE operation will not lock out DML, statements even for a short period of time.

In some cases, a user might want to move non-partitioned tables from one tablespace to another or might want to change the compression property (e.g., for information lifecycle management purposes). Concurrent with performance of an ALTER TABLE MOVE command to move non-partitioned tables from one tablespace to another, rows can be filtered (e.g., by using the EXCLUDING keyword, or by using the INCLUDING keyword).

Figure 5:
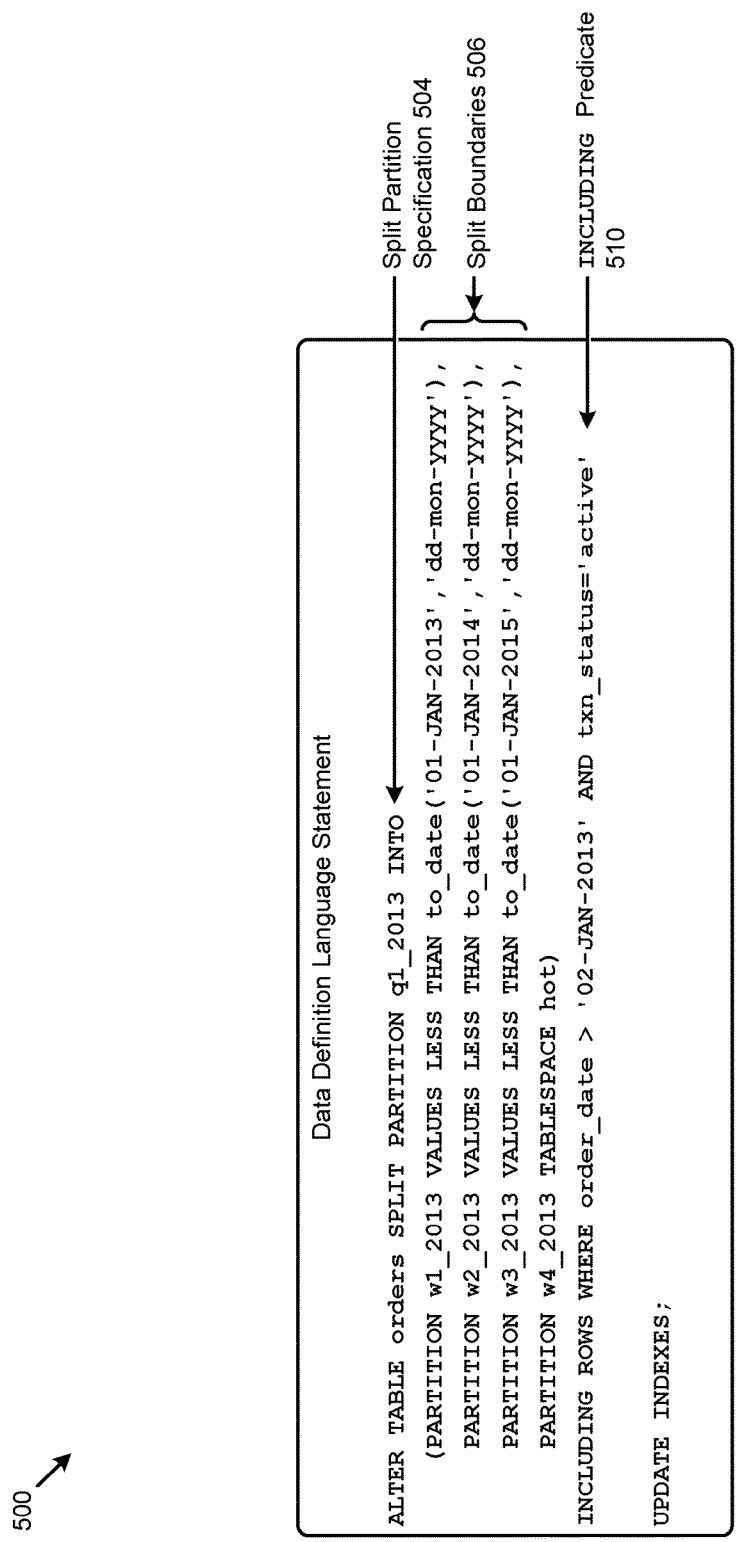
FIG. 5 presents an example of a split operation data definition language statement used to perform partition maintenance operations while concurrently filtering rows based on a query language predicate, according to an embodiment.

FIG. 5 presents an example of a split operation data definition language statement 500 used to perform partition maintenance operations while concurrently filtering rows based on a query language predicate. As an option, one or more variations of split operation data definition language statement 500 or any aspect thereof may be implemented in the context of the architecture and functionality of the embodiments described herein. The split operation data definition language statement 500 or any aspect thereof may be implemented in any environment.

The embodiment shown in FIG. 5 is merely one example of syntax used to specify an ALTER TABLE orders SPLIT PARTITION operation. The shown syntax includes a split partition specification 504 that includes the INTO keyword followed by specifications of split boundaries 506. The split boundaries are defined by the shown dates. The example further comprises use of an including predicate 510 using the keyword INCLUDING and of using a predicate formed by a SQL inequality expression. This example keeps rows that are newer, and drops rows that are older.

Some embodiments support multiple predicates in WHERE expressions as shown in Table 2 and some embodiments support predicates in WHERE expressions with JOIN operations as shown in Table 3.

TABLE 2

Multi-predicate WHERE expression

| Ref | Information |
|---|---|
| 1 | REM remove orders that are fulfilled and remove all orders that are from customers that are not active anymore, irrespective of the order status |
| 2 | REM |
| 3 | ALTER TABLE sales MERGE PARTITIONS sales_q1_2012, sales_q2_2012 INTO partition sales_h1_2012 |
| 4 | TABLESPACE cheap_storage COMPRESS FOR QUERY HIGH |
| 5 | INCLUDING ROWS WHERE order_fullfilled = 'N' |
| 6 | or customer_id in (SELECT customer_id from customers WHERE customer_status = 'active') ONLINE; |

TABLE 3

Multi-predicate WHERE expression with JOIN

| Ref | Information |
|---|---|
| 1 | REM the same statement as before, just using different syntax with a join |
| 2 | REM |
| 3 | ALTER TABLE sales MERGE PARTITIONS sales_q1_2012, sales_q2_2012 INTO PARTITION sales_h1_2012 |
| 4 | TABLESPACE cheap_storage COMPRESS FOR QUERY HIGH |
| 5 | INCLUDNG ROWS JOIN customers ON (customers.cust_id = sales.cust_id) |
| 6 | WHERE sales.order_fulfilled = 'Y' OR customers.customer_status = 'active' ONLINE; |

While the foregoing presents examples of data definition language syntax for codifying data definition language commands, the shown data definition language constructs are merely examples, and other syntax or language constructs are possible. Moreover, some systems such as are shown and described as pertains to the following FIG. 6 process DDL statements in a processing element separate from the processing element used for processing DML statements.

Figure 6:
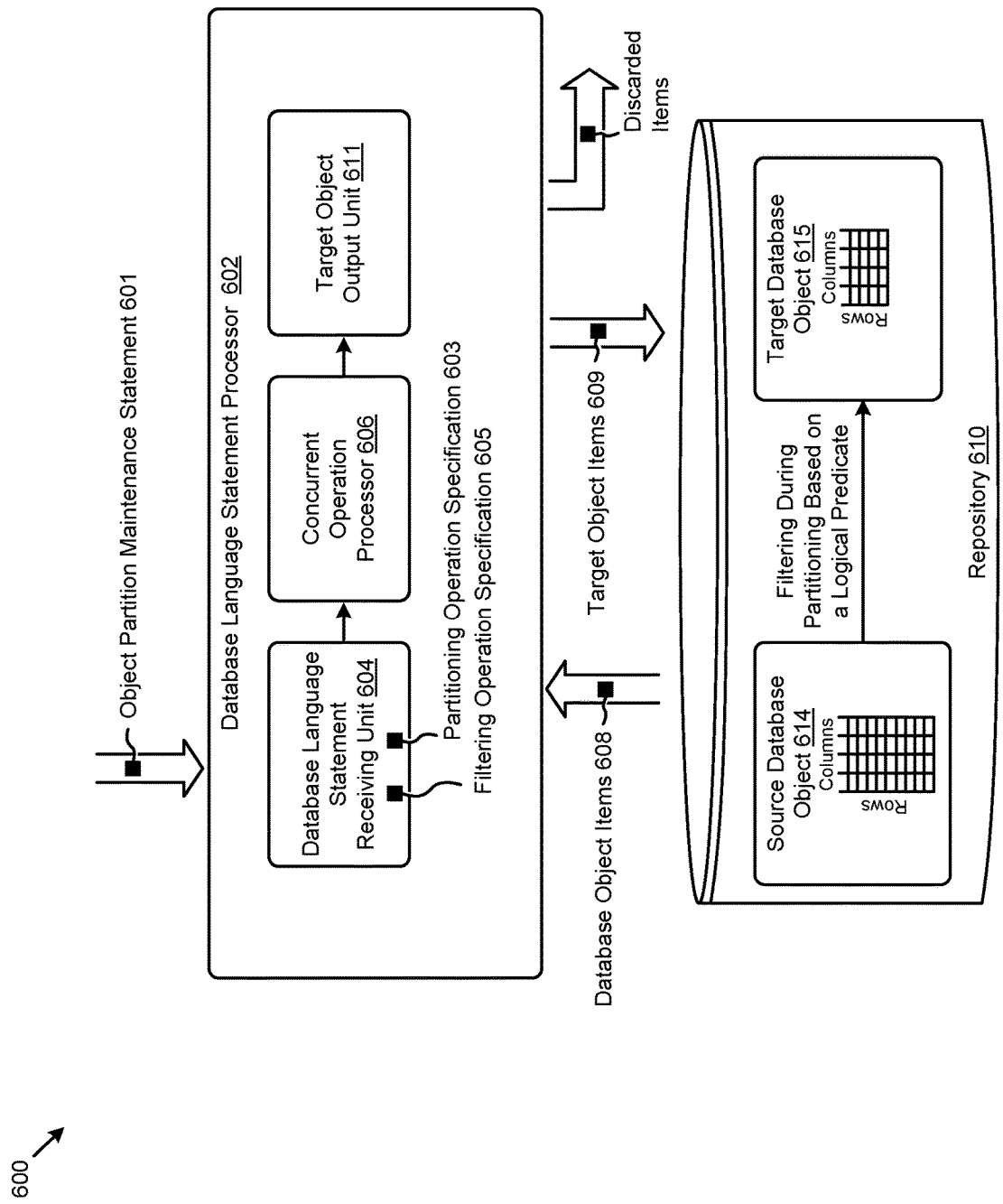
FIG. 6 is a block diagram of a system used to perform partition maintenance operations while concurrently performing row filtering operations based on a query language predicate, according to some embodiments.

FIG. 6 is a block diagram of a system 600 used to perform partition maintenance operations while concurrently performing row filtering operations based on a query language predicate. As an option, one or more variations of system 600 or any aspect thereof may be implemented in the context of the architecture and functionality of the embodiments described herein. The system 600 or any aspect thereof may be implemented in any environment.

The embodiment shown in FIG. 6 includes a database language statement processor 602 that receives database language statements. As shown the database language statement processor receives an object partition maintenance statement 601, which is received and parsed by a database language statement receiving unit 604. The parsing performed by the shown database language statement receiving unit includes identification of a partitioning operation specification 603 and identification of a filtering operation specification 605, both of which are included in the parsed object partition maintenance statement 601.

The partitioning operation specification is composed of one or more clauses that are codified into a database language such a SQL. The clause can include partition names and/or partition ranges. The performance of the partitioning operation that is codified into the partitioning operation specification serves to divide a large database object into one or more smaller database objects.

The filtering operation specification is composed of one or more clauses that are codified into a database language such as SQL. The filtering operation specification may include one or more expressions that can be combined to form a logical predicate that can be used to perform a test against any portion of a database object entry. The performance of the filtering operation that is codified into the filtering operation specification serves to discard items that match the predicate of the filtering operation specification. The discarding is performed as a consequence of performance of the aforementioned partitioning operation in combination with the performance of the filtering operation.

As shown, repository 610 holds a source database object 614 (e.g., a table having rows and columns). The database language statement processor 602 includes a concurrent operation processor 606 that retrieves database object items 608 from the repository, processes them, and produces target object items 609 that are in turn stored in the repository in the form of a target database object 615. The aforementioned database object items may comprise any variations of database objects, possibly including tables (as shown), partitioning metadata, access statistics metadata, etc. The aforementioned target object items 609 may comprise any variations of objects, possibly including a partitioned table (as shown), respective partitioning metadata, etc.). As shown, the filtered partition maintenance operation of FIG. 6 takes a larger table with many rows and filters out the rows based on a logical predicate to produce a smaller table with fewer rows. The logical predicate is used to determine whether or not to include (or exclude) predicate-matching entries in the target object. For example, when processing a database language statement that includes an EXCLUDING keyword and predicate, the rows of the source database object that match the predicate are not output to the repository 610. When the processing of a partition maintenance statement results in one or more new or altered tables or partitions, new or altered metadata can be stored in a metadata storage area, possibly in the same repository as the target database object. In some cases, a target object output unit 611 is employed to perform additional processing, such as compression or indexing pertaining to the target database object 615.

System Architecture Overview
Additional System Architecture Examples

Figure 7:
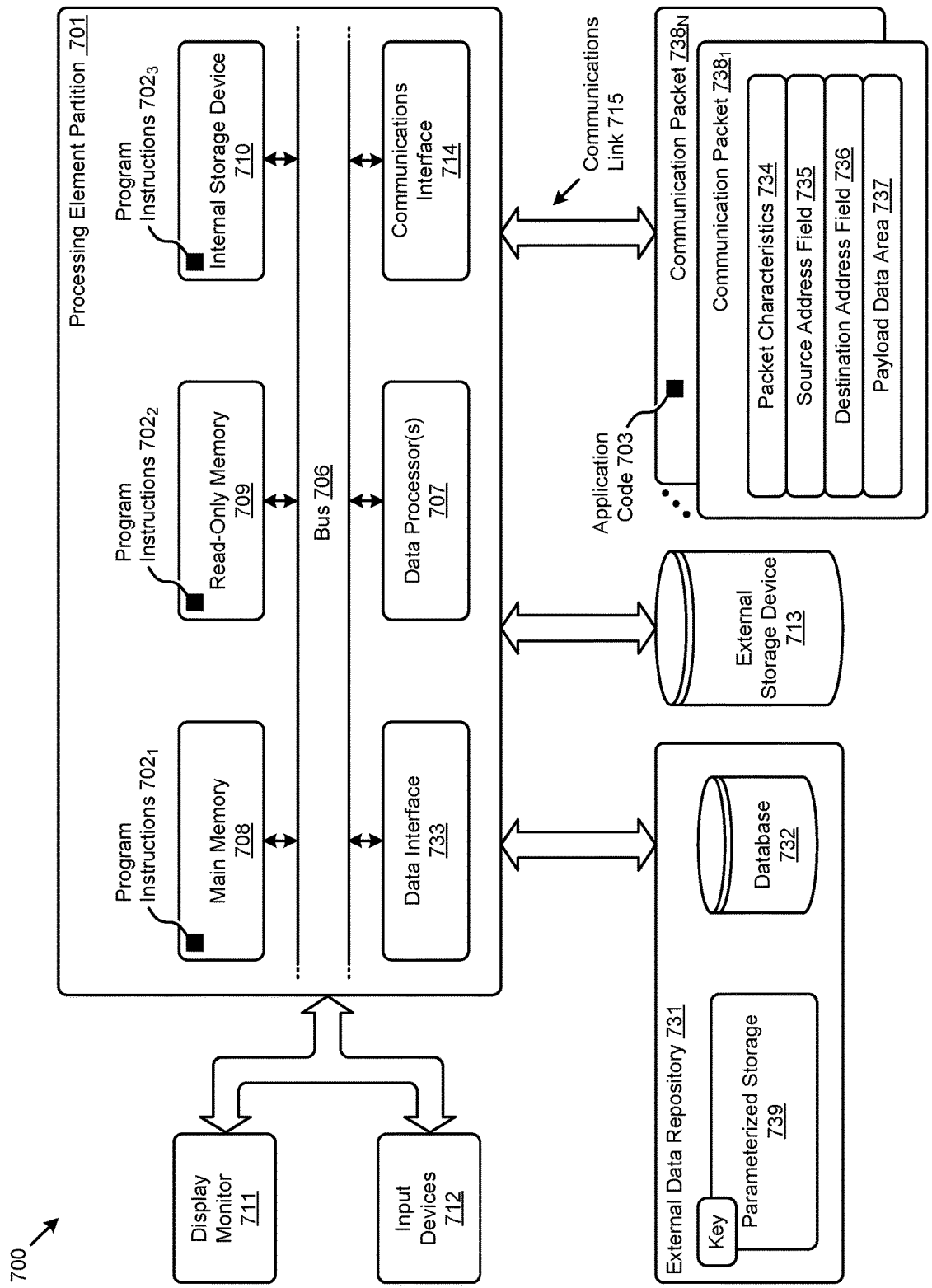
FIG. 7 depicts an exemplary architecture of components suitable for implementing embodiments of the present disclosure and/or for use in the herein-described environments.

FIG. 7 depicts an exemplary architecture suitable for implementing embodiments of the present disclosure. Computer system 700 includes a bus 706 or other communication mechanism for communicating information. The bus interconnects subsystems and devices such as a CPU, or a multi-core CPU (e.g., data processors 707), a system memory (e.g., main memory 708, or an area of random access memory), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 700 further comprises a display 711 (e.g., CRT or LCD), various input devices 712 (e.g., keyboard, cursor control), and an external data repository 731.

According to an embodiment of the disclosure, computer system 700 performs specific operations by data processors 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 700 performs specific networking operations using one or more instances of communications interface 714. Instances of the communications interface 714 may comprise one or more networking ports that are configurable (e.g., pertaining to speed, protocol, physical layer characteristics, media access characteristics, etc.) and any particular instance of the communications interface 714 or port thereto can be configured differently from any other particular instance. Portions of a communication protocol can be carried out in whole or in part by any instance of the communications interface 714, and data (e.g., packets, data structures, bit fields, etc.) can be positioned in storage locations within communications interface 714, or within system memory, and such data can be accessed (e.g., using random access addressing, or using direct memory access (DMA), etc.) by devices such as data processors 707.

The communications link 715 can be configured to transmit (e.g., send, receive, signal, etc.) any types of communications packets (e.g., communication packet $738_1$, . . . , communication packet $738_N$) comprising any organization of data items. The data items can comprise a payload data area 737, a destination address field 736 (e.g., a destination IP address), a source address field 735 (e.g., a source IP address), and can include various encodings or formatting of bit fields to populate the shown packet characteristics 734. In some cases the packet characteristics include a version identifier, a packet or payload length, a traffic class, a flow label, etc. In some cases the payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processors 707 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of the computer system 700. According to certain embodiments of the disclosure, two or more instances of computer system 700 coupled by a communications link 715 (e.g., LAN, PTSN, or wireless network) may perform the sequence of instructions required to practice embodiments of the disclosure using two or more instances of components of computer system 700.

The computer system 700 may transmit and receive messages such as data and/or instructions organized into a data structure (e.g., communications packets). The data structure can include program instructions (e.g., application code 703), communicated through communications link 715 and communications interface 714. Received program code may be executed by data processors 707 as it is received and/or stored in the shown storage device or in or upon any other non-volatile storage for later execution. Computer system 700 may communicate through a data interface 733 to a database 732 on an external data repository 731. Data items in a database can be accessed using a primary key (e.g., a relational database primary key).

The processing element partition 701 is merely one sample partition. Other partitions can include multiple data processors, and/or multiple communications interfaces, and/ or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processors 707. Some embodiments include one or more special-purpose hardware components (e.g., power control, logic, sensors, transducers, etc.). A module may include one or more state machines and/or combinational logic used to implement or facilitate the operational and/or performance characteristics pertaining to performing partition maintenance operations while concurrently filtering rows based on a query language predicate.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of performing partition maintenance operations while concurrently filtering rows based on a query language predicate). Such files or records can be brought into and/or stored in volatile or non-volatile memory.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for performing row filtering operations when performing a database object partition maintenance operation that generates a target database object from a source database object, comprising:
   receiving a database language statement to discard records from further processing with the source database object, the database language statement comprising both a partitioning operation specification and a filtering operation specification that includes a logical predicate that is used to determine whether or not to include or exclude a predicate-matching record in the target database object; and
   creating a new partition from the source database object at least by processing a partitioning operation of the partitioning operation specification while processing the filtering operation to discard the records in the source database object from being populated into the partition when the records corresponds to the logical predicate, wherein
   the partitioning operation defines one or more characteristics pertaining to a structure for the partition and creates partition by storing, together with the filtering operation, a subset of records in the source database object into the partition, and
   the subset of records does not contain any of the records to be discarded from the further processing according to the database language statement.

2. The method of claim 1, wherein the partitioning operation specification includes information at least one of a database table or a named partition.

3. The method of claim 1, wherein processing the filtering operation does not generate a redo stream entry, and does not generate an undo stream entry.

4. The method of claim 1, wherein processing the filtering operation does not perform any locking or unlocking operations pertaining to the records to be deleted.

5. The method of claim 1, wherein the database language statement is a structured query language (SQL) statement, processing the partition of the partitioning operation specification creates the partition and a separate partition, and the separate partition includes the records that are discarded from being populated into the partition.

6. The method of claim 5, wherein at least a portion of the SQL statement comprises an ALTER keyword.

7. The method of claim 5, wherein the SQL statement includes at least one of, a MOVE keyword, a SPLIT keyword, or a MERGE keyword.

8. The method of claim 1, wherein the logical predicate is a structured query language (SQL) predicate expression.

9. The method of claim 8, wherein the SQL predicate expression comprises at least one of, a Boolean expression, or an inequality operator, or a join expression, or any combination thereof.

10. The method of claim 1, wherein the source database object is an index.

11. A non-transitory computer readable medium having stored thereon a sequence of instructions which, when stored in memory and executed by one or more processors, causes the one or more processors to perform a set of acts for performing row filtering operations when performing a database object partition maintenance operation that generates a target database object from a source database object, the set of acts comprising:
receiving a database language statement to discard records from further processing with the source database object, the database language statement comprising both a partitioning operation specification and a filtering operation specification that includes a logical predicate that is used to determine whether or not to include or exclude a predicate-matching record in the target database object; and
creating a new partition from the source database object at least by processing a partitioning operation of the partitioning operation specification while processing the filtering operation to discard the records in the source database object from being populated into the partition when the records correspond to the logical predicate, wherein
the partitioning operation defines one or more characteristics pertaining to a structure for the partition and creates partition by storing, together with the filtering operation, a subset of records in the source database object into the partition, and
the subset of records does not contain any of the records to be discarded from the further processing according to the database language statement.

12. The computer readable medium of claim 11, wherein the partitioning operation specification includes information about at least one of a database table or a named partition.

13. The computer readable medium of claim 11, wherein processing the filtering operation does not generate a redo stream entry, and does not generate an undo stream entry.

14. The computer readable medium of claim 11, wherein processing the filtering operation does not perform any locking or unlocking operations pertaining to the records to be deleted.

15. The computer readable medium of claim 11, wherein the database language statement is a structured query language (SQL) statement, processing the partition of the partitioning operation specification creates the partition and a separate partition, and the separate partition includes the records that are discarded from being populated into the partition.

16. The computer readable medium of claim 15, wherein at least a portion of the SQL statement comprises an ALTER keyword.

17. The computer readable medium of claim 15, wherein the SQL statement includes at least one of, a MOVE keyword, a SPLIT keyword, or a MERGE keyword.

18. The computer readable medium of claim 11, wherein the logical predicate is a structured query language (SQL) predicate expression.

19. A system for performing row filtering operations when performing a database object partition maintenance operation that generates at least one target database object from a source database object, comprising:
a non-transitory storage medium having stored thereon a sequence of instructions; and
one or more processors that execute the sequence of instructions, an execution of sequence of instructions causing the one or more processors to perform a set of acts, the set of acts comprising,
receiving a database language statement to discard records from further processing with the source database object, the database language statement comprising both a partitioning operation specification and a filtering operation specification that includes a logical predicate that is used to determine whether or not to include or exclude a predicate-matching record in the target database object, and
creating a new partition from the source database object at least by processing a partitioning operation of the partitioning operation specification while processing the filtering operation to discard the records in the source database object from being populated into the partition when the records correspond to the logical predicate, wherein
the partitioning operation defines one or more characteristics pertaining to a structure for the partition and creates the partition by storing, together with the filtering operation, a subset of records in the source database object into the partition, and
the subset of records does not contain any of the records discarded from the further processing deleted from the source database object according to an execution of the database language statement.

20. The system of claim 19, wherein the partitioning operation specification includes information about at least one of a database table or a named partition, processing the partition of the partitioning operation specification creates the partition and a separate partition, and the separate partition includes the records that are discarded from being populated into the partition.

* * * * *

UNITED STATES PATENT AND TRADEMARK OFFICE
CERTIFICATE OF CORRECTION

PATENT NO. : 10,929,360 B2  
APPLICATION NO. : 15/266863  
DATED : February 23, 2021  
INVENTOR(S) : Baer et al.

Page 1 of 1

It is certified that error appears in the above-identified patent and that said Letters Patent is hereby corrected as shown below:

In the Specification

In Column 7, Line 20, delete "="Closed"" and insert -- ="Closed"" --, therefor.

In Column 7, Line 40, delete " _fullfilled" and insert -- _fulfilled --, therefor.

In Column 9, Line 42, delete "DML," and insert -- DML --, therefor.

In Column 10, Line 21, delete " _fullfilled" and insert -- _fulfilled --, therefor.

In Column 10, Line 35, delete "INCLUDNG" and insert -- INCLUDING --, therefor.

In Column 13, Line 22, delete "PTSN," and insert -- PSTN, --, therefor.

In the Claims

In Column 14, Line 42, in Claim 1, after "creates" insert -- the --.

In Column 14, Line 49, in Claim 2, after "information" insert -- about --.

In Column 15, Line 35, in Claim 11, after "creates" insert -- the --.

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*